United States Patent [19]

Sekigami et al.

[11] Patent Number: 4,878,357
[45] Date of Patent: Nov. 7, 1989

[54] AIR-CONDITIONING APPARATUS

[75] Inventors: Kunie Sekigami, Ota; Kouji Nagae; Yoji Sasaki, both of Oizumi, all of Japan

[73] Assignee: Sanyo Electric Co., Ltd., Osaka, Japan

[21] Appl. No.: 287,086

[22] Filed: Dec. 21, 1988

[30] Foreign Application Priority Data

Dec. 21, 1987 [JP] Japan .................................. 62-324493
Mar. 29, 1988 [JP] Japan .................................. 63-75733
Sep. 20, 1988 [JP] Japan .................................. 63-235806

[51] Int. Cl.$^4$ ............................................. F25B 13/00
[52] U.S. Cl. ...................................... 62/160; 62/324.6; 62/228.4
[58] Field of Search ................... 62/160, 324.6, 228.4, 62/229

[56] References Cited

U.S. PATENT DOCUMENTS 3,234,754  2/1966  Quick ..................................... 62/278
4,441,335  4/1984  Bonne .................................. 62/324.6

FOREIGN PATENT DOCUMENTS 52-24710  7/1977  Japan .
52-24711  7/1977  Japan .
52-27459  7/1977  Japan .
54-3020   2/1979  Japan .
0073440   6/1979  Japan .................................. 62/324.6

Primary Examiner—William E. Wayner
Attorney, Agent, or Firm—Wenderoth, Lind & Ponack

[57] ABSTRACT

A multiroom air conditioning apparatus includes an outdoor side unit having a compressor and an outdoor heat exchanger, and a plurality of room units having an indoor heat exchanger. A high-pressure gas pipe and a low-pressure gas pipe, connected to the compressor, are branched so that a high-side branch pipe and a low-side branch pipe are connected to the outdoor heat exchanger via outside valves. A liquid pipe through which a refrigerant passes from the high-pressure gas pipe is connected to the outdoor heat exchanger, and branched to provide liquid pipes. The indoor heat exchanger is connected to the branched liquid pipes via expansion device and to the high-side branch pipe and the low-side branch pipe via inside valves. By controlling the outside and inside valves, a selected room unit or units can be cooled or heated.

4 Claims, 10 Drawing Sheets

AIR-CONDITIONING APPARATUS

BACKGROUND OF THE INVENTION

The present invention relates to a multiroom air-conditioning apparatus having an outdoor side unit and a plurality of room units and adapted to simultaneously cool or heat all of a plurality of rooms, and simultaneously cool one room and heat the other.

The multiroom air-conditioning apparatus capable of simultaneously cooling one of a plurality of rooms and heating the others are proposed in Japanese Pat. Publication Nos. 52-24710/1977, 52-24711/1977 and 52-27459/1977 and Japanese Utility Model Publication No. 54-3020/1979.

In the multiroom air-conditioning apparatus disclosed in the above Japanese Pat. Publication Nos. 52-24710/1977 and 52-24711/1977, four-way changeover valves and outdoor heat exchangers the numbers of which are in agreement with that of outdoor side units are required. Consequently the construction of the pipe circuits becomes complicated, and the manufacturing cost increases. Since it is necessary that, with respect to each room unit, two inter-unit pipes be drawn out from the outdoor side unit, two inter-unit pipes be drawn out from the outdoor side unit, the number of the inter-unit pipes increases, and the piping becomes troublesome. Moreover, during a room cooling and heating operation in which one of a plurality of rooms is cooled with the others heated simultaneously, the outdoor heat exchangers corresponding to the room units function as condensers and evaporators to discard the heat to the outside, which heat cannot be recovered.

In the multiroom air-conditioning apparatus disclosed in the above Japanese Utility Model Publication No. 52-27459/1977, a combination of a coolable room and heatable room in a room cooling and heating operation, in which one of a plurality of rooms is cooled with the others heated simultaneously, is determined in advance, and the room cooling and heating operations cannot be selectively carried out in each room. Namely, these air-conditioning apparatus cannot be conveniently used.

SUMMARY OF THE INVENTION

An object of the present invention is to provide a multiroom air-conditioning apparatus capable of solving these problems.

Another object of the present invention is to provide a new multiroom air-conditioning apparatus which permits that any number of room units can be combined by simply connecting rooms units in a branch manner to inter-unit pipes.

A further object of the present invention is to provide an improved air-conditioning apparatus, in which not only the simultaneous room cooling operations and simultaneous room heating operations of a plurality of arbitrarily selected room units but also the simultaneous room cooling and heating operations thereof can be carried out.

Another object of the present invention is to provide an improved air conditioning apparatus which permits arbitrary room cooling and heating operations of the room units, by varying the capacity of the capacity variable compressor and the capacity of the outdoor heat exchangers in accordance with temperature or refrigerant pressure in the heat exchangers in the indoor side or room units.

A further object of the present invention is to provide an air-conditioning apparatus by which the room cooling and heating operations can be carried out efficiently on the basis of the efficient heat recovering actions of the heat exchangers.

The present invention provides an air-conditioning apparatus comprising an outdoor side unit having a compressor, and an outdoor heat exchanger placed in contact with outside air or a water, a plurality of room units having an indoor heat exchanger placed in contact with indoor air for selectively providing heating or cooling, wherein a high-pressure gas pipe, connected at one end thereof to said compressor, has high-side branch pipes, a low-pressure gas pipe being connected at one end thereof to said compressor and having low-side branch pipes, at least one of said high-side branch pipes and at least one of said low-side branch pipes being connected to one end of said outdoor heat exchanger via an outside valve for changing refrigerant flow, another of said high-side branch pipes having auxiliary high side pipes, another of said low-side branch pipes having auxiliary low-side pipes, said auxiliary high-side pipes and said auxiliary low-side pipes being connected to one end of said indoor heat exchangers via inside valves for changing refrigerant flow, a liquid pipe being connected to the other end of said outdoor heat exchanger and having liquid branch pipes, said liquid branch pipes connected to the other ends of said indoor heat exchangers via expansion devices, and wherein said other portion of said high-side branch pipe, at least a part of each of said auxiliary high-side pipes, said other portion of said low-side branch pipe, at least a part of each of said auxiliary low-side pipes, a part of said liquid pipe and at least a part of each of said liquid branch pipes are disposed between said outdoor unit and said room units.

According to another embodiment of the invention, there is provided an air-conditioning apparatus comprising: an outdoor side unit having a capacity-variable compressor, and outdoor heat exchanger placed in contact with outside air or a water, a plurality of room units having indoor heat exchangers placed in contact with indoor air for selectively providing heating or cooling, and an operation controller adapted to control said capacity-variable compressor and valves for changing refrigerant flow, wherein a high-pressure gas pipe being connected at one end thereof to said compressor has high-side branch pipes, a low-pressure gas pipe being connected at one end thereof to said compressor and having low-side branch pipes, at least one of said high-side branch pipes and at least one of said low side branch pipes being connected to one end of said outdoor heat exchanger via said outside valve, another portion of said high-side branch pipes having auxiliary high-side pipes, another portion of said low-side branch pipes having auxiliary low-side pipes, said auxiliary high-side pipes and said auxiliary low-side pipes being connected to one end of said indoor heat exchangers via said inside valves, a liquid pipe being connected to the other end of said outdoor heat exchanger and having liquid branch pipes, said branch pipes being connected to the other ends of said indoor heat exchangers via expansion devices, wherein said operation controller has capacity setting means for comparing first compressor capacity required by said room unit in a room cooling operation with second compressor capacity required by said room units in a room heating operation during simultaneous room cooling and heating operations, wherein at least one unit is subjected to a room cooling operation with the remaining indoor units subjected to a room heating operation, and operating said capacity-variable compressor with the capacity set to a level corresponding to the higher capacity of said first compressor capacity and said second compressor capacity.

In another embodiment of the present invention, there is provided an air-conditioning apparatus comprising an outdoor side unit having a capacity-variable compressor, and outdoor heat exchanger placed in contact with outside air or a water, a plurality of room units having indoor heat exchangers placed in contact with indoor air for selectively providing heating or cooling, and an operation controller adapted to control said capacity-variable compressor and valves for changing refrigerant flow, wherein a plurality of said outdoor heat exchangers are provided, a high-pressure gas pipe being connected at one end thereof to said compressor has high-side branch pipes, a low-pressure gas pipe being connected at one end thereof to said compressor and having low-side branch pipes, at least two of said high-side branch pipes and at least two of said low-side branch pipes being connected to one end of said outdoor heat exchanger via said valve, another portion of said high-side branch pipes having auxiliary high-side pipes, another portion of said low-side branch pipes having auxiliary low-side pipes, said auxiliary high-side pipes and said auxiliary low-side pipes being connected to one end of said indoor heat exchangers via said valves, a liquid pipe being connected to the other ends of said outdoor heat exchangers and having liquid branch pipes, said liquid branch pipes connected to the other ends of said indoor heat exchangers via expansion devices, wherein said operation controller has capacity varying means adapted to control the capacity of said capacity-variable compressor and said valves in accordance with at least one of the temperature, refrigerant pressure in said indoor heat exchangers, and temperature of the indoor air discharged from said room units.

In order to cool all of a plurality of rooms at once, the outside valves for all of the outdoor heat exchangers and the inside valves for all of the indoor heat exchangers are set in a cooling mode. Consequently, the refrigerant discharged from the capacity variable compressor flows from the discharge pipe into the outdoor heat exchangers simultaneously, in which the refrigerant is condensed and liquefied, and the resultant liquid is distributed to the refrigerant pressure reducing devices in the room units through the liquid pipe. After the liquid has been evaporated in these indoor heat exchangers, the vapor is sucked into the capacity variable compressor through the low-pressure gas pipe in the mentioned order. All the rooms are cooled by the indoor heat exchangers which thus work as evaporators.

When the temperature in the indoor heat exchangers is not lower than 2° C. during such a cooling operation, the capacity variable compressor is operated with a capacity required by the room units. When the temperature in these indoor heat exchangers decreases to lower than 2° C., the increase of the capacity of the compressor is prohibited. When this temperature further decreases to lower than 0° C., the capacity of the compressor is reduced to prevent the indoor heat exchangers from being frozen.

In order to heat all the rooms simultaneously, the outside valves for the outdoor heat exchangers and the inside valves for the indoor heat exchangers are set in a heating mode. Consequently, the refrigerant discharged from the capacity variable compressor is distributed to the indoor heat exchangers through the discharge pipe and high-pressure gas pipe in the mentioned order, in which heat exchangers the refrigerant is condensed and liquefied. The resultant liquid flows through the relative expansion devices and joins in the liquid pipe. The liquid then flows to the outdoor heat exchangers simultaneously and evaporated therein, and the resultant vapor is sucked into the compressor through the low-pressure gas pipe. All the rooms are heated by the indoor heat exchangers which thus work as condensers.

When the temperature in the indoor heat exchangers is not higher than 58° C., the increase in the capacity of the compressor is prohibited. When this temperature further increases to higher than 60° C., the capacity of the compressor is reduced to prevent the high pressure from abnormally increasing.

In order to simultaneously cool, for example, two arbitrarily selected rooms and heat one room, the change-over valve for one outdoor heat exchanger is set in a cooling mode with the valve for the other outdoor heat exchanger closed, and the inside valve in the room unit to be cooled is set in a cooling mode with the inside valve in the room unit to be heated set in a heating mode. Consequently, a part of the refrigerant discharged from the capacity variable compressor flows into the first-mentioned outdoor heat exchanger alone, and the remaining refrigerant into the heat exchanger in the room unit to be heated, through the high-pressure gas pipe, the refrigerant being condensed and liquified in these indoor and outdoor heat exchangers. The refrigerant condensed and liquefied in these heat exchangers is distributed to the expansion devices in the room units to be cooled has been evaporated in the indoor heat exchangers, it is sucked into the capacity variable compressor through the low-pressure gas pipe in the mentioned order. Thus, one room is heated by one indoor heat exchanger working as a condenser, and two rooms are cooled by the other indoor heat exchanger working as an evaporator.

When the temperature in the indoor heat exchanger in the unit in a cooling operartion is not lower than 2° C. with the temperature in the indoor heat exchanger in the unit in a heating operation not higher than 58° C. during such simultaneous cooling and heating operations, the compressor capacity required by the unit in a heating operation are compared, and the capacity variable compressor is operated with the capacity set to the higher of these two. When these temperature conditions are not satisfied, the capacity of the outdoor heat exchangers is controlled in accordance with the temperatures in the indoor heat exchangers in the units in cooling and heating operations, or the increase in the capacity of the compressor is prohibited, or the capacity of the compressor is lowered, whereby the freezing of the indoor heat exchangers and the abnormal increase of the high pressure can be prevented.

DETAILED DESCRIPTION OF THE PREFERRED EMBODIMENTS

Figure 1:
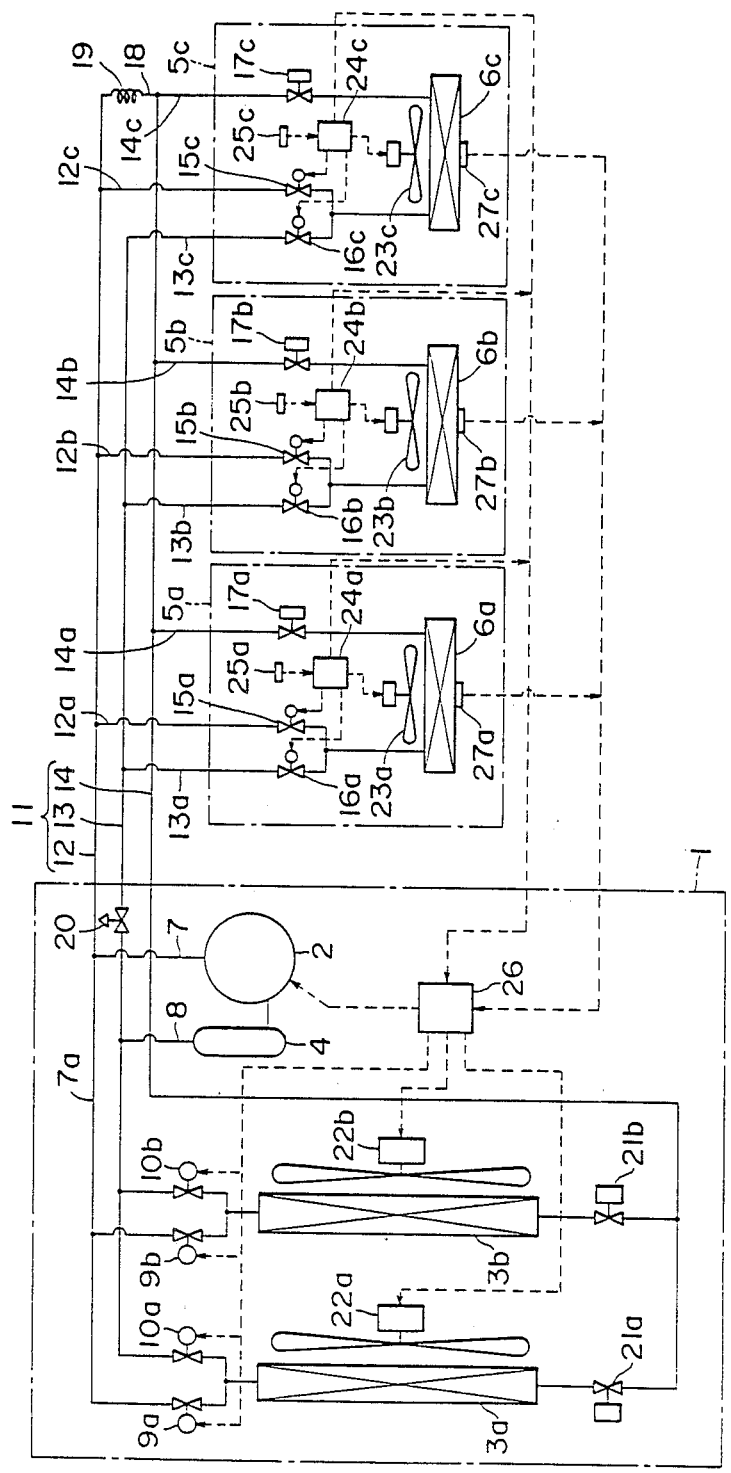
FIG. 1 is a diagram of a refrigerant circuit in a first embodiment of the air-conditioning apparatus according to the present invention.

A first embodiment of the present invention will be described with reference to FIG. 1. An outdoor side unit 1 has a capacity variable compressor 2 capable of varying its operational frequency by an inverter, outdoor heat, exchangers 3a, 3b and gas-liquid separator 4. Room units 5a, 5b, 5c have heat exchangers 6a, 6b, 6c. The outdoor heat exchangers 3a, 3b are connected via high-side branch pipe 7a to a high-pressure gas pipe 7 and a low-pressure gas pipe 8, which extend from the capacity variable compressor 2, through outside valves 9a, 10a, 9b, 10b. An ,inter-unit pipe assembly 11, by which the outdoor side unit 1 and room units 5a, 5b, 5c are connected together, has a high-pressure gas pipe 12 joined to the high-pressure gas pipe 7 branching therefrom, a low-pressure gas pipe 13 joined to the low-pressure gas pipe 8 branching therefrom, and a liquid pipe 14 joined to the outdoor heat exchangers 3a, 3b, an auxiliary high-side pipes 12a, 12b, 12c and auxiliary low-side pipes 13a, 13b, 13c and liquid branch pipes 14a, 14b, 14c. The indoor heat exchangers 6a, 6b, 6c are connected separately to the auxiliary high-side pipes 12a, 12b, 12c and the auxiliary low-side gas pipes 13a, 13b, 13c via inside valves 15a, 16a, 15b, 16b, 15c, 16c, and to the liquid branch pipes 14a, 14b, 14c via expansion devices 17a, 17b, 17c having electric expansion valves.

The other high-side branch pipe 12 is connected to the liquid pipe 14 by a bypass pipe 18, and a capillary tube 19 offers a refrigerant flow passage resistance.

A vapor pressure regulating valve 20 provided in the other low-side branch pipe 13, auxiliary expansion devices 21a, 21b have electric expansion valves and provided in the liquid pipe 14. Reference nuumerals 22a and 22b represent outdoor blowers, and 23a, 23b, 23c indoor blowers.

Room cooling and heating mode switching means 24a, 24b, 24c are shown. The temperature in the rooms in which the room units 5a, 5b, 5c are installed is detected by room temperature sensors 25a, 25b, 25c. When the detected temperatures are higher than a set level, a cooling command is given, and, conversely, when these detected temperatures are lower than the set level, a heating command is given. Consequently, the inside valves 15a, 16a, 15b, 16b, 15c, 16c are switched, and the number of revolutions per minute of the indoor blowers 23a, 23b, 23c is controlled.

Reference numeral 26 denotes a capacity control device in the outdoor side unit 1. The temperatures in the indoor heat exchangers 6a, 6b, 6c are detected by sensors 27a, 27b, 27c. As shown in the load map of FIG. 2, when the temperature in the indoor heat exchangers in the unit in a cooling operation is not lower than 2° C. with the temperature in the indoor heat exchangers 6a, 6b, 6c in the unit in a heating operation not higher than 58° C., the compressor capacity required by the unit in a cooling operation and that required by the unit in a heating operation are supplied to the respective room cooling and heating mode switching device 24a, 24b, 24c and compared with each other, and the capacity variable compressor 2 is operated with the capacity set to the higher of the two. When these temperature conditions are not satisfied, the outside valves 9a, 10a, 9b, 10b are opened or closed in accordance with the temperatures in the units in a cooling operation and in a heating operation so as to control the capacity of the outdoor heat exchangers 3a, 3b, or the increase of the capacity variable compressor 2 is prohibited, or the capacity of the compressor 2 is lowered, and the number of revolutions per minute of the outdoor blowers 22a, 22b is controlled, by the capacity control device 26.

The operation of the embodiment of FIG. 1 will now be described with reference to the load map of FIG. 2 and the flow chart of FIG. 3. When the cooling demands are given out from the cooling and heating mode switching device 24a, 24b, 24c in all of the room units 5a, 5b, 5c, the inside valves on one side 15a, 15b, 15c are closed, and the other inside valves 16a, 16b 16c are opened. The operation of the indoor blowers 23a, 23b, 23c is started and cooling signals from the cooling and heating mode switching devices 24a, 24b, 24c are supplied into the capacity control device 26. The capacity variable compressor 2 is then operated with the capacity (operational frequency of 95 Hz) corresponding to the sum of the compressor capacity (for example, an operational frequency of 25 Hz) required by the room unit 5a, the compressor capacity (for example, an operational frequency of 30 Hz) required by the room unit 5b and the compressor capacity (for example, an operational frequency of 40 Hz) required by the room unit 5c. At the same time, the outdoor blowers 22a, 22b are operated, and the outside valves 9a, 9b on one side are opened with the other outside valves 10a, 10b closed. Consequently, the refrigerant discharged from the capacity variable compressor 2 flows through the high pressure pipe 7, outside valves 9a, 9b and outdoor heat exchangers 3a, 3b in the mentioned order, and is condensed and liquefied. The resultant refrigerant is distributed to the expansion devices 17a, 17b, 17c in the room units 5a, 5b, 5c through the liquid pipe 14, in which devices 17a, 17b, 17c the pressure of the refrigerant is reduced. The refrigerant is then evaporated in the indoor heat exchangers 6a, 6b, 6c, and the vapor produced is sucked into the capacity variable compressor 2 through the inside valves 16a, 16b, 16c, other low-side branch pipe 13, low pressure gas pipe and accumuulator 4 in the mentioned order. Thus, all the rooms are cooled simultaneously by the indoor heat exchangers 6a, 6b, 6c which work as evaporators. The pressure of the refrigerant may also be reduced by the auxiliary expansion devices 21a, 21b instead of the expansion devices 17a, 17b, 17c.

During such simultaneous cooling and heating operations, the refrigerant discharged from the capacity variable compressor 2 is introduced from the other high-side branch pipe 12 into the liquid pipe 14 through a bypass pipe 18, so that the refrigerant and lubricating oil do not stagnate in the other high-side branch pipe 12. One end of the bypass pipe 18 may be connected to the other high-side branch pipe 12, and the other end thereof to the other low-side branch pipe 13.

When the room temperature of, for example, the room unit 5b or 5c has reached a set level during such simultaneous cooling and heating operations, so that the cooling operation stops in accordance with a stop signal from the cooling and heating mode switching device 24b or 24c to cause the cooling load to become smaller, the operational frequency of the capacity variable, compressor 2 decreases to 65 Hz or 55 Hz, and the compressor is operated with a lower capacity.

Figure 2:
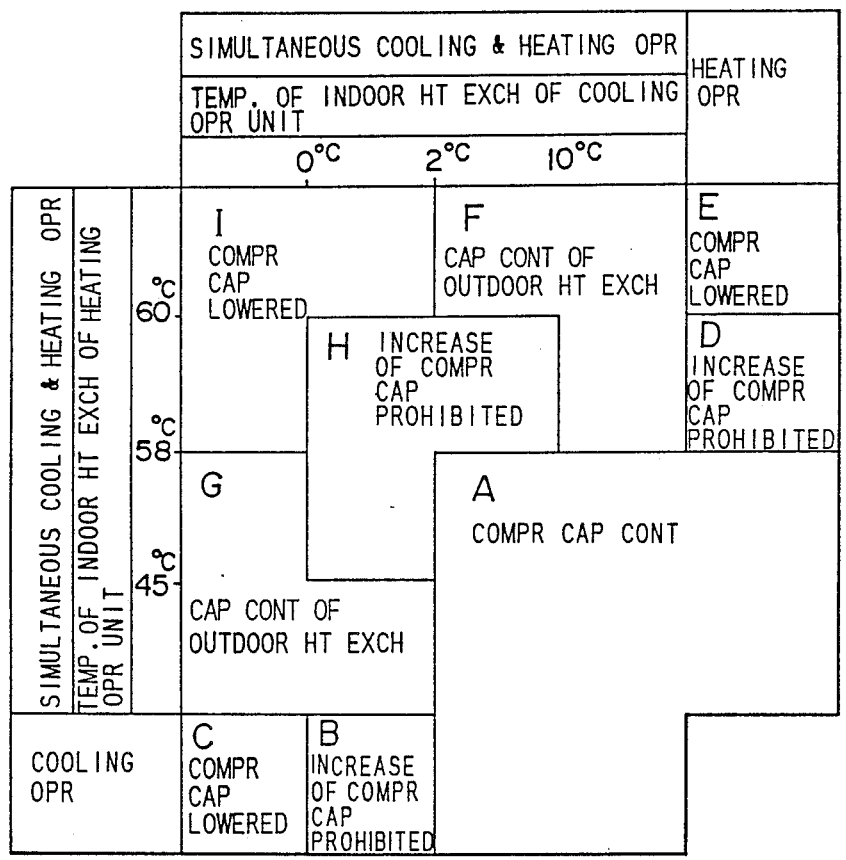
FIG. 2 is a load map for the first embodiment of the present invention.
Figure 3:
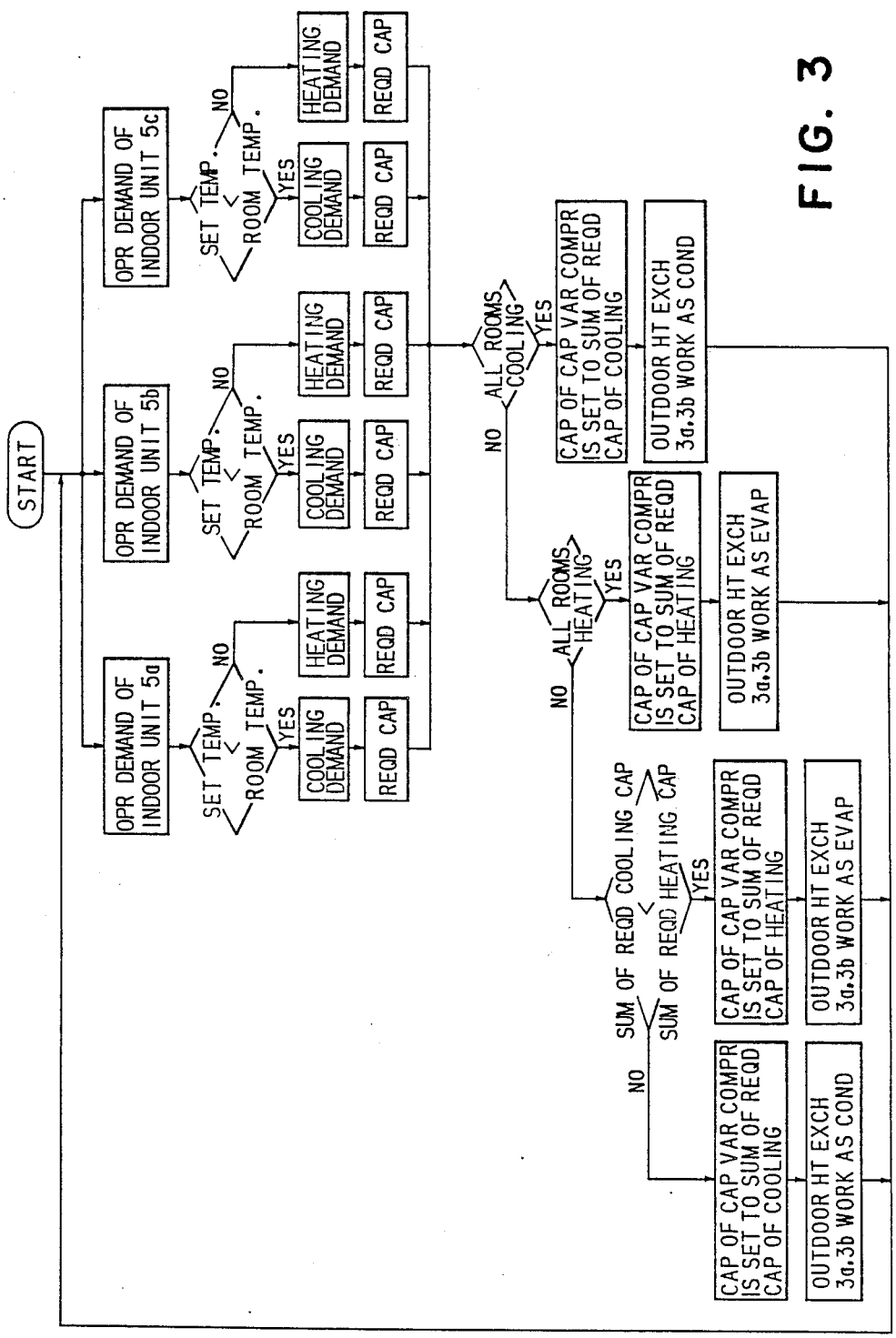
FIG. 3 is a flow chart for the first embodiment of the present invention.

When the temperature in the indoor heat exchangers is in a zone A of a temperature of not lower than 2° C. shown in FIG. 2, during such a cooling operation, the capacity variable compressor 2 is operated with the capacity required by the room units. When the temperature in the indoor heat exchangers decreases to lower than 2° C. to enter a zone B, the increase of the capacity of the compressor 2 is prohibited. When this temperature further decreases to lower than 0° C. to enter a zone C, the capacity of the compressor 2 is lowered to prevent the indoor heat exchangers from being frozen.

Conversely, when heating commands are given out from the cooling and heating mode switching devices 24a, 24b, 24c in all the room units 5a, 5b, 5c, the inside valves 15a, 15b, 15c on one side are opened with the other inside valves 16a, 16b, 16c closed, and heating signals from the cooling and heating mode switching devices 24a, 24b, 24c are supplied into the capacity variable compressor 2. Consequently, the compressor 2 is operated with the capacity set to a level (operational frequency of 110 Hz) corresponding to the sum of the compressor capacity (for example, an operational frequency of 30 Hz) required by the room unit 5a, the compressor capacity (for example, an operational frequency of 35 Hz) required by the room unit 5b and the compressor capacity ( for example, an operational frequency of 45 Hz ). At the same time, the outside valves 9a, 9b on one side are closed with the other outside valves 10a, 10b opened. As a result, the refrigerant discharged from the capacity variable compressor 2 is distributed to the inside valves 15a, 15b, 15c and indoor heat exchangers 6a, 6b, 6c through the high-pressure gas pipe 7 and other high-side branch pipe 12 in the mentioned order, and condensed and liquefied therein. The pressure of the resultant refrigerant is reduced by the expansion devices 17a, 17b, 17c or the auxiliary expansion devices 21a, 21b, and the refrigerant is then joined in the liquid pipe 14. The resultant refrigerant is evaporated in the outdoor heat exchangers 3a, 3b, and sucked into the capacity variable compressor 2 through the outside valves 10a, 10b low-pressure gas pipe 8 and accumulator 4 in the mentioned order. Thus, all the rooms are heated simultaneously by the indoor heat exchangers 6a, 6b, 6c which works as evaporators.

When the temperature in, for example, the room unit 5b or 5c reaches a set level during such a heating operation to cause the heating operation to stop in accordance with a stop signal from the cooling and heating mode switching device 24b or 24c, the operational frequency of the capacity variable compressor 2 decreases to 75 Hz or 65 Hz in accordance with a signal supplied from the capacity control device 26. When the temperature in the indoor heat exchangers is in the zone A of not higher than 58° C. shown in FIG. 2, during such a room heating operation, the capacity variable compressor 2 is operated with the capacity set to a level required by the room units. When the temperature in the indoor heat exchangers increases to not lower than 58° C. to enter a zone D the increase of the capacity of the compressor 2 is prohibited. When this temperature further increases to not lower than 60° C. to enter a zone E, the capacity of the compressor 2 is lowered to prevent the high pressure from abnormally increasing.

In order to simultaneously cool two rooms and heat one room, cooling demands are given out from the cooling and heating mode switching devices 24a, 24c in, for example, two arbitrary room units 5a, 5c, so that the respective inside valves 15a, 15c are closed with the other inside valves 16a, 16c opened, and a heating demand is given out from the cooling and heating mode switching device 24b in one arbitrary room unit 5b, so that the inside valve 15b on one side is opened with the other inside valve 16b closed. At the same time, the sum (operational frequency of 65 Hz) of the compressor capacity (for example, an operational frequency of 25 Hz) required by the room unit 5a to be put into a cooling operation and the compressor capacity (for example, an operational frequency of 40 Hz) required by the room unit 5c to be put into a cooling operation, and the compressor capacity (for example, an operational frequency of 50 Hz) required by the room unit 5b to be put into a heating operation are compared with each other. A control signal is supplied from the capacity control device 26 so that the capacity variable compressor 2 is operated with the capacity set to a level corresponding to the higher capacity, which is required by the units to be put into a cooling operation, of the two units 5a, 5b. In accordance with a signal from this capacity control device 26, one outside valve 9a is opened, and the other outside valves 9b, 10a, 10b are closed. Consequently, a part of the refrigerant discharged from the capacity variable compressor 2 flows into one outdoor heat heat exchanger 3a alone through the high pressure gas pipe 7 and outside valve 9a in that order, while the remaining refrigerant flows into the inside valve 15b and heat exchanger 6b in the room unit 5b through the other high pressure branch pipe 12, the refrigerant being condensed and liquefied in these indoor heat exchanger 6b and outdoor exchanger 3a. The pressure of the refrigerant condensed and liquefied in these heat exchangers 6b, 3a is reduced by the expansion devices 17a, 17c in the room units 5a, 5c through the liquid pipe 14. The resultant refrigerant is evaporated in the respective indoor heat exchangers 6a, 6c and then joins in the other low-side branch pipe 13 through the inside valves 16a, 16c, the refrigerant being thereafter sucked into the capacity variable compressor 2 through the low-pressure gas pipe 8 and accumulator 4 in that order. Thus, one room is heated by the indoor heat exchanger 6b which works as a condenser, and two other rooms are cooled by the indoor heat exchangers 6a, 6c which work as evaporators.

When such simultaneous room cooling and heating operations are carried out in summer in which the temperature of the outside air is high, the heat cannot be thrown away sufficiently to the outside air by the operation of the outdoor heat exchanger 3a only, even if the outdoor blower 22a is rotated at a high speed. Consequently, when the temperature in the indoor heat exchangers 6a, 6c becomes not is above 2° C. to enter a zone F in which the cooling capacity decreases, the outside valve 9b is opened in accordance with a signal from the capacity switching device 26, and a part of the refrigerant discharged from the high-pressure gas pipe 7 flows into the other outdoor heat exchanger 3b, in which the refrigerant is condensed and liquefied. The resultant refrigerant joins the refrigerant in the liquid pipe 14, and the heat is further thrown away to the outside air by the outdoor heat exchanger 3b, which works as a condenser, whereby a decrease of the cooling capacity is prevented. When the temperature in, for example, the room unit 5c reaches a set level in such operations in summer, so that the cooling operation is stopped in accordance with a signal from the cooling and heating mode switching device 24c to cause the cooling load to lower, the compressor capacity (for example, an operational frequency of 25 Hz) required by the room unit 5a to be put into a cooling operation and the compressor capacity (for example, an operational frequency of 50 Hz) required by the room unit 5b to be put into a heating operation are compared, and a control signal is supplied from the capacity control device 26 so that the capacity variable compressor is operated with the capacity set to a level (operational frequency of 50 Hz) corresponding to the larger capacity of these two.

When such simultaneous room cooling and heating operations are carried out in winter, the low refrigerant pressure is influenced by the temperature of the outside air, so that the pressure of the refrigerant in the heat exchangers 6a, 6c in the room units 5a, 5c in a cooling operation tends to decrease to not higher than 4 kg/cm$^2$. However, this pressure decrease is prevented by the operation of an evaporation pressure regulating valve 20, and the indoor heat exchangers 6a, 6c are not frozen. Such an evaporation pressure regulating valve 20 may be provided in each of pipes 13a, 13b, 13c, which are installed between the valves 16a, 16b, 16c and other low-side branch pipe 13 instead of in the other low-side branch pipe 13. Instead of operating the evaporation pressure regulating valve 20 thus provided, the degree of opening of the expansion devices 17a, 17c may be reduced when the refrigerant pressure, in the indoor heat exchangers 6a, 6c decreases to below 4 kg/cm$^2$, to increase the degree of superheat of the refrigerant and prevent, by the heat thus generated, the occurrence of freezing, the degree of opening of the expansion devices 17a, 17c being increased to the original level when the freezing preventing operation is completed.

In order to cool one room and heat two rooms, the auxilliary expansion device 21a is operated. For example, when heating demands are given out from the cooling and heating mode switching device 24a, 24c in two arbitrary room units 5a, 5c, the respective inside valves 15a, 15c are opened with the other inside valves 16a, 16c closed. At the same time, a cooling demand is given out from the cooling and heating mode switching device 24b in one room unit 5b, so that one inside valve 16b opened. Consequently, the sum (operational frequency of 85 Hz) of a compressor capacity (for example, an operational frequency of 45 Hz) required by the room unit 5a to be put into a heating operation and a compressor capacity (for example, an operational requency of 40 Hz) required by the room unit 5c to be put into a heating operation, and a compressor capacity (for example, an operational frequency of 35 Hz) required by the room unit 5b to be put into a cooling operation are compared, and a control signal is supplied from the capacity control device 26 so that the capacity variable compressor is operated with the capacity set to a level (operational frequency of 85 Hz) corresponding to the larger capacity of these two, i.e. the total capacity of the room units to be put into a heating operation. In accordance with the signal from the capacity control device 26, one outside valve 10a is opened with the other outside valves 9a, 9b, 10b closed.

Consequently, refrigerant discharged from the capacity variable compressor 2 is discharged to the inside valves 15a, 15c through the other pressure gas pipe 7 and high-side branch pipe 12 in that order, and condensed and liquefied in the respective indoor heat exchangers 6a, 6c. The liquefied refrigerant flows into the liquid pipe 14 through the fully opened expansion devices 17a, 17c. The pressure of a part of this liquid refrigerant in this liquid pipe 14 is reduced in the expansion device 17b, and the resultant refrigerant is evaporated in the indoor heat exchanger 6b. The pressure of the remaining liquid refrigerant is reduced in the auxiliary expansion device 21a, and the resultant refrigerant is evaporated in the outdoor heat exchanger 3a. The evaporated liquid is sucked into the capacity variable compressor 2 through the low-pressure gas pipe 8 and accumulator 4 in that order. Thus, two rooms are heated by the indoor heat exchangers 6a, 6c which work as condensers, and one room is cooled by the indoor heat exchanger 6b which works as an evaporator.

When such simultaneous room cooling and heating operations are carried out in winter in which the temperature of the outside air is low, the heat source cannot be taken sufficiently from the outside air by the operation of the outdoor heat exchanger 3a alone, even if the outdoor blower 22a is rotated at a high speed. When the temperature in the indoor heat exchangers 6a, 6c then decreases to less than 58° C. to enter a zone G in which the room heating capacity lowers, the outside valve 10b is opened in accordance with a signal from the capacity control device 26, and the auxiliary expansion device 21b is operated, s that the other outdoor heat exchanger 3b is also operated as an evaporator. Therefore, a decrease of the room heating capacity can be prevented. When the temperature in, for example, the room unit 5c reaches a set level during this operation in winter, so that the room heating operation is stopped in accordance with a signal from the cooling and heating mode switching device 24c, the compressor capacity (for example, an operational frequency of 45 Hz) required by the room unit 5a in a heating operation and that (for xample, 35 Hz) required by the room unit 5b in a cooling operation are compared, and a control signal is supplied from the capacity control device 26 so that the capacity variable compressor 2 is operated with the capacity set to a level (operational frequency of 45 Hz) corresponding to the larger capacity of the two, which is required by the unit in a heating operation.

When such simultaneous cooling and heating operations are carried out in spring or autumn, an intermediate season, with the temperature in the indoor heat exchanger 6b, which works as an evaporator, increasing to 2° C. or above to enter the zone F in which the cooling capacity decreases, outdoor blower 22a is switched from a high-speed operation to a low-speed operation in accordance with a signal from the capacity switching device 26 and then stopped. Thus, the rate of extracting heat from the outside air is reduced to prevent a decrease of the room cooling capacity. When the cooling capacity further decreases, the outside valves 9a, 10a are switched so as to operate the outdoor heat exchanger 9a as a condenser.

When the temperature in the indoor heat exchanger in a cooling operation and indoor heat exchanger in a heating operation enters a zone H, the increase of the capacity of the capacity variable compressor 2 is prohibited. When this temperature then enters a zone I, the capacity of the compressor is lowered to prevent the indoor heat exchangers in a cooling operation from being frozen, and the temperature in the indoor heat exchangers in a heating operation is detected to prevent the high pressure from abnormally increasing.

The indoor units 5a, 5b, 5c are thus subjected to automatic cooling and heating operations arbitrarily in accordance with cooling and heating commands given out from the cooling and heating mode switching device 24a, 24b, 24c on the basis of the results of a comparison between the temperature, and the outdoor heat exchangers 3a, 3b are operated as condensers or evaporators by the capacity switching device 26 in accordance with the magnitude of the cooling and heating loads, whereby the cooling and heating operations are carried out efficiently. Moreover, heat recovery is carried out by the indoor heat exchangers 6a, 6b, 6c which work as evaporators and condensers during simultaneous cooling and heating operations, so that the operation efficiency can be further improved.

When the outdoor heat exchangers 3a, 3b operated as evaporators during an all-room heating operation are frosted, one outside valve 9a is opened with the other outside valve 10a closed in accordance with a signal from the capacity switching device 26 to introduce a part of the refrigerant, which is discharged at a high temperature from the high pressure gas pipe 7, into one outdoor heat exchanger 3a, whereby this outdoor heat exchanger 3a is defrosted. This outside valve 9a is then closed with the other outside valve 10a opened, to operate the outdoor heat exchanger 3a as an evaporator again. At the same time, the outside valve 9b is opened with the outside valve 10b closed, to introduce a part of the high-temperature discharged refrigerant from the high pressure gas pipe 7 into the other outdoor heat exchanger 3b, whereby this outdoor heat exchanger 3b is defrosted. Thus, the all-room heating operation is carried out continuously as the outdoor heat exchangers 3a, 3b are defrosted alternately.

When one outdoor heat exchanger 3a working as an evaporator is frosted during simultaneous room cooling and heating operation, in which one of the outdoor heat exchangers 3a, 3b works as an evaporator with the other stopped, the outside valves 9a, 10a on one side are switched in accordance with a signal from the capacity switching device 26 so as to defrost the outdoor heat exchanger 3a, and, at the same time, the other outside valves 9b, 10b are switched so as to operate the outdoor heat exchanger 3b as an evaporator, whereby the simultaneous cooling and heating operations are carried out continuously.

In order to switch, for example, the room unit 5b, alone to a heating operation during the above-mentioned all-room cooling operation, both of the inside valves 15b, 16b are closed, and the degree of opening of the expansion device 17b is increased slightly to increase the refrigerant pressure in the indoor heat exchanger 6b in advance, the inside valve 15b being thereafter opened, whereby the occurrence of a differential refrigerant pressure, which causes a refrigerant sound to be generated, can be prevented.

Similarly, in order to switch, for example, the room unit 5b alone to a room cooling operation during an all-room heating operation, one inside valve 15b and expansion device 17b are closed, and the other inside valve 16 is opened slightly to forcibly reduce the refrigerant pressure in the indoor heat exchanger 6, or the inside valve 16b is also closed to cause the refrigerant pressure in the indoor heat exchanger 6b to naturally decrease. When the inside valve 16b is thereafter opened, the occurrence of a differential refrigerant pressure, which causes a refrigerant sound to be generated, can be prevented.

In order to slightly open the inside valve 16b, an expensive, degree-of-opening regulatable electric valve is used as the inside valve 16b. Accordingly, if a bypass capillary pipe for use in releasing pressure is provided in parallel with the inside valve 16b and inside valves 16a, 16c, simple valves can be used as these inside valves 16a, 16b, 16c.

In the above-described embodiment, the temperature in the indoor heat exchangers 6a, 6b, 6c is detected by the sensors 27a, 27b, 27c. Instead of such a temperature, the refrigerant pressure, which has correlation with this temperature, in the indoor heat exchangers or the temperature of the air cooled and heated in and blown from the indoor heat exchangers may be detected.

Figure 4:
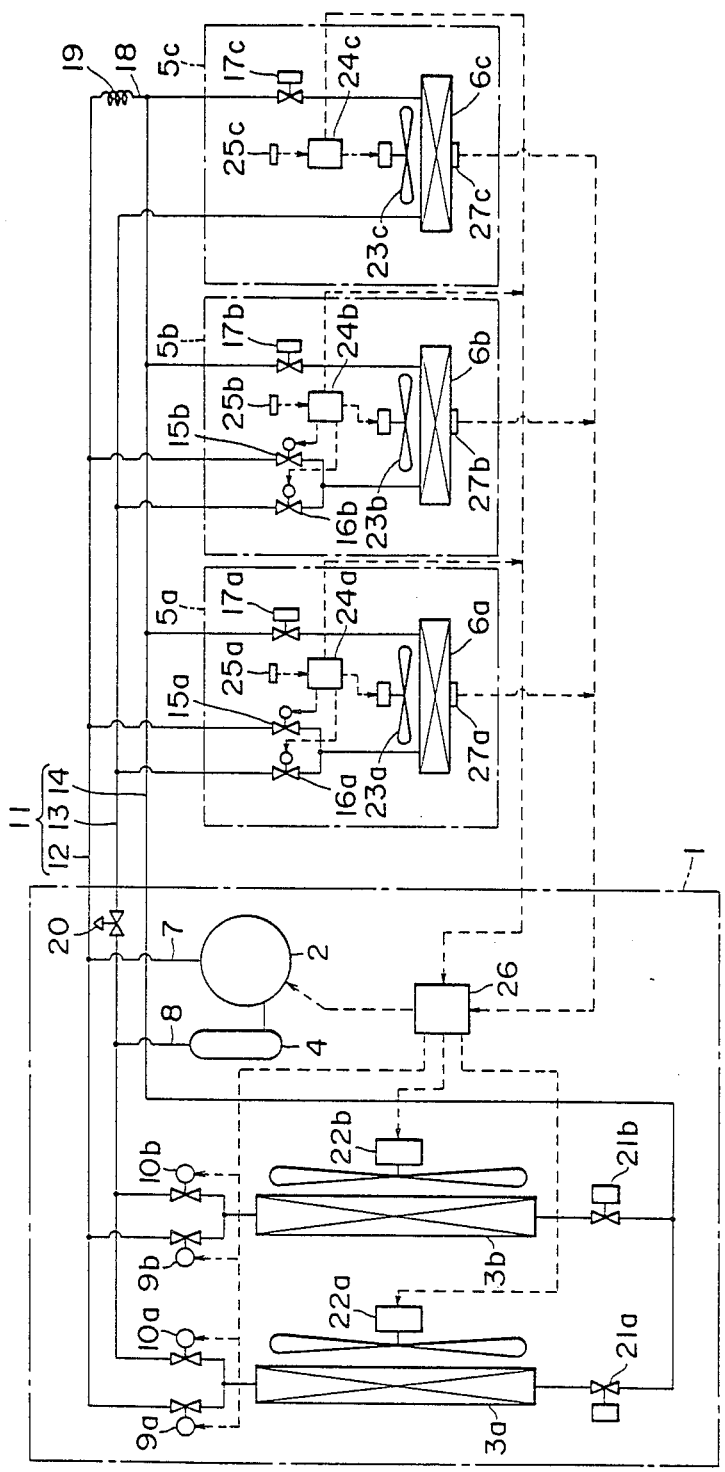
FIG. 4 is a diagram of a refrigerant circuit in a second embodiment of the air-conditioning apparatus according to the present invention.

FIG. 4 shows a second embodiment of the present invention, in which, when a room unit 5c is provided in a room cooled all the year round, such as a computer room, an indoor heat exchanger 6c is connected directly to a low-pressure gas pipe 13 without using the inside valves 15c, 16c. The parts of this embodiment are designated by the same reference numerals, and the detailed descriptions thereof are omitted.

Figure 5:
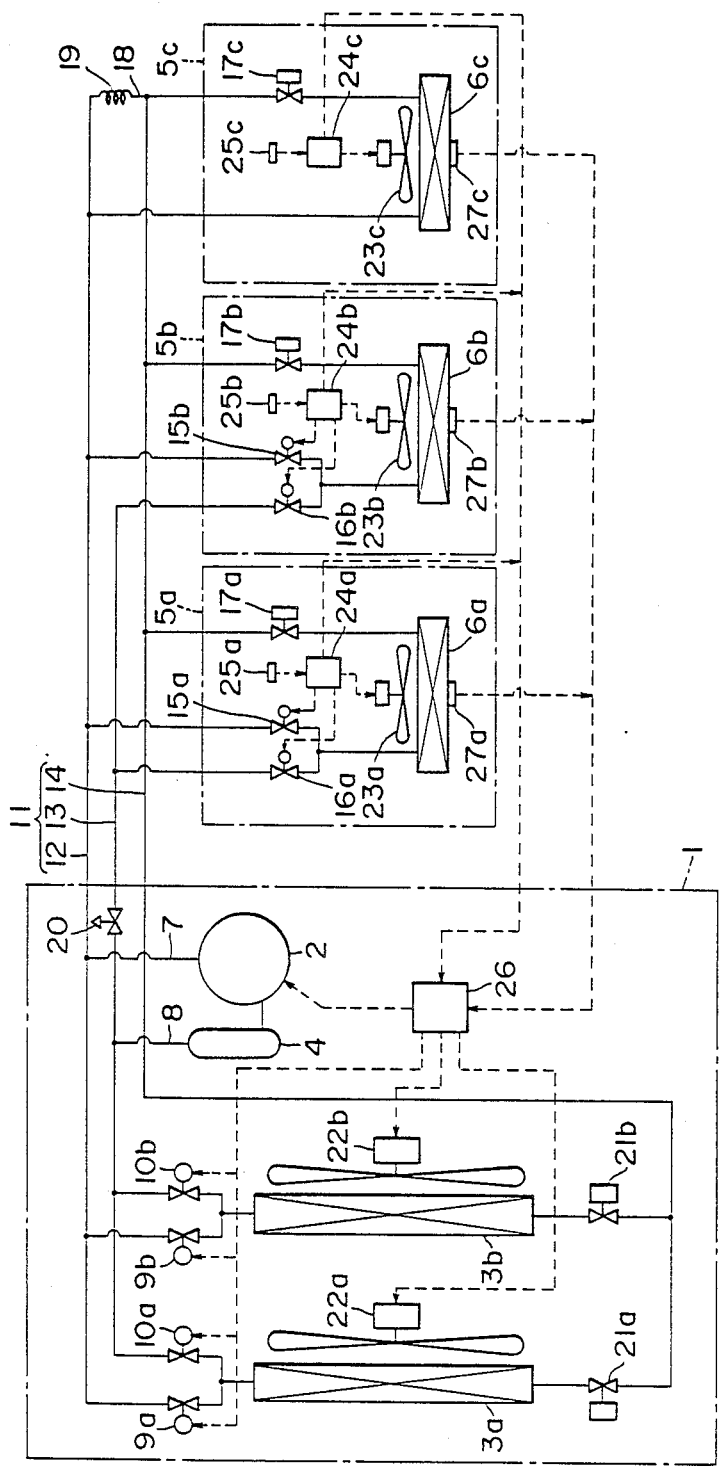
FIG. 5 is a diagram of a refrigerant circuit in a third embodiment of the air-conditioning apparatus according to the present invention.

FIG. 5 shows a third embodiment of the present invention, in which, when an indoor heat exchanger 6c is utilized for a year-round room heating operation and a hot water supply operation, it is connected directly to a high-pressure gas pipe 12 without using the inside valves 15c, 16c. The parts of this embodiment which correspond to those of the first embodiment of FIG. 1 are designated by the same reference numerals, and the detailed description thereof are omitted.

Figure 6:
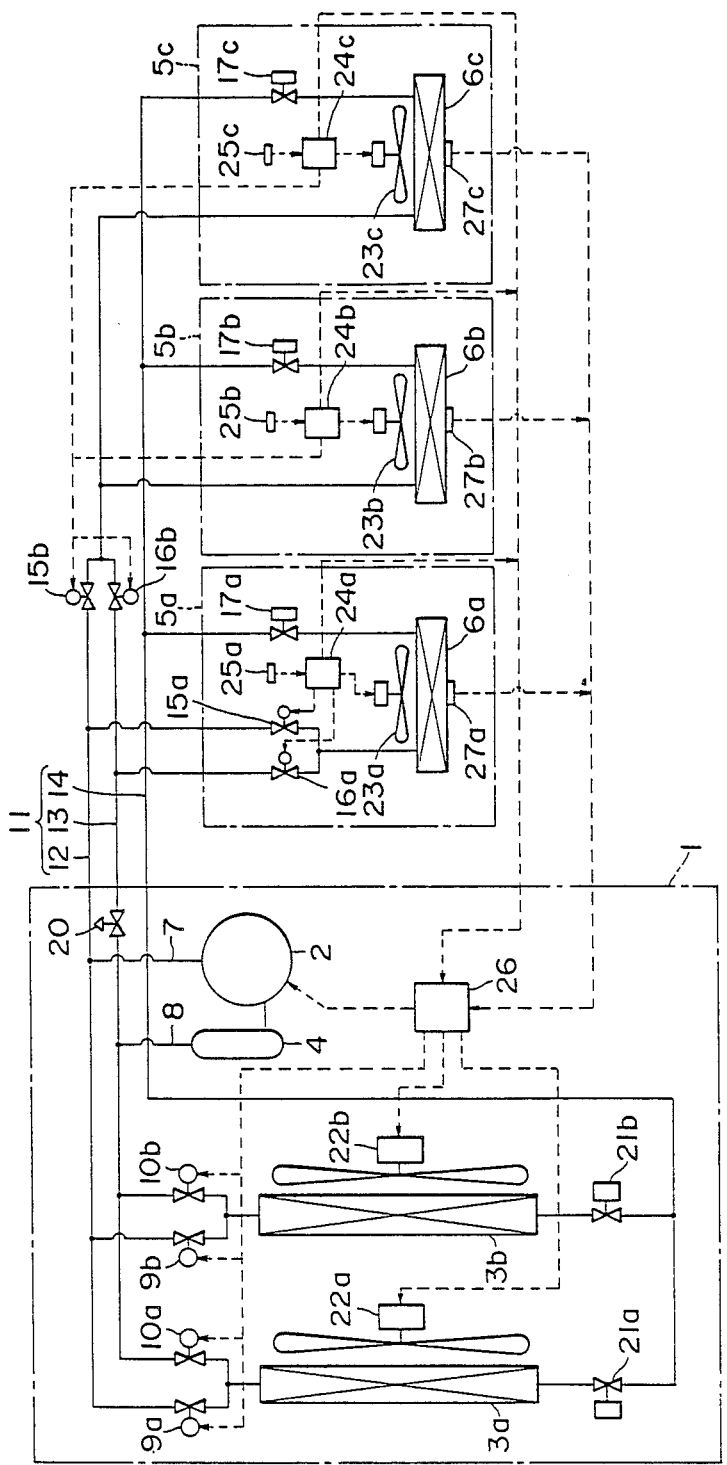
FIG. 6 is a diagram of a refrigerant circuit in a fourth embodiment of the air-conditioning apparatus according to the present invention.

FIG. 6 shows a fourth embodiment of the present invention, in which a room unit 5a is provided in an unspecified room with other room units 5b, 5c installed in specific larger rooms, the room units 5b, 5c using valves 15b, 16b in common. Thus, the cooling and heating operations of the room unit 5a are carried out by switching inside valves 15a, 16a, and the cooling and heating operations of the room units 5b, 5c simultaneously by operating the room units 5b, 5c simultaneously by operating the inside valves 15a, 16b. The parts of this embodiment which correspond to those of the first embodiment are designated by the same reference numerals, and the detailed descriptions thereof are omitted.

Figure 7:
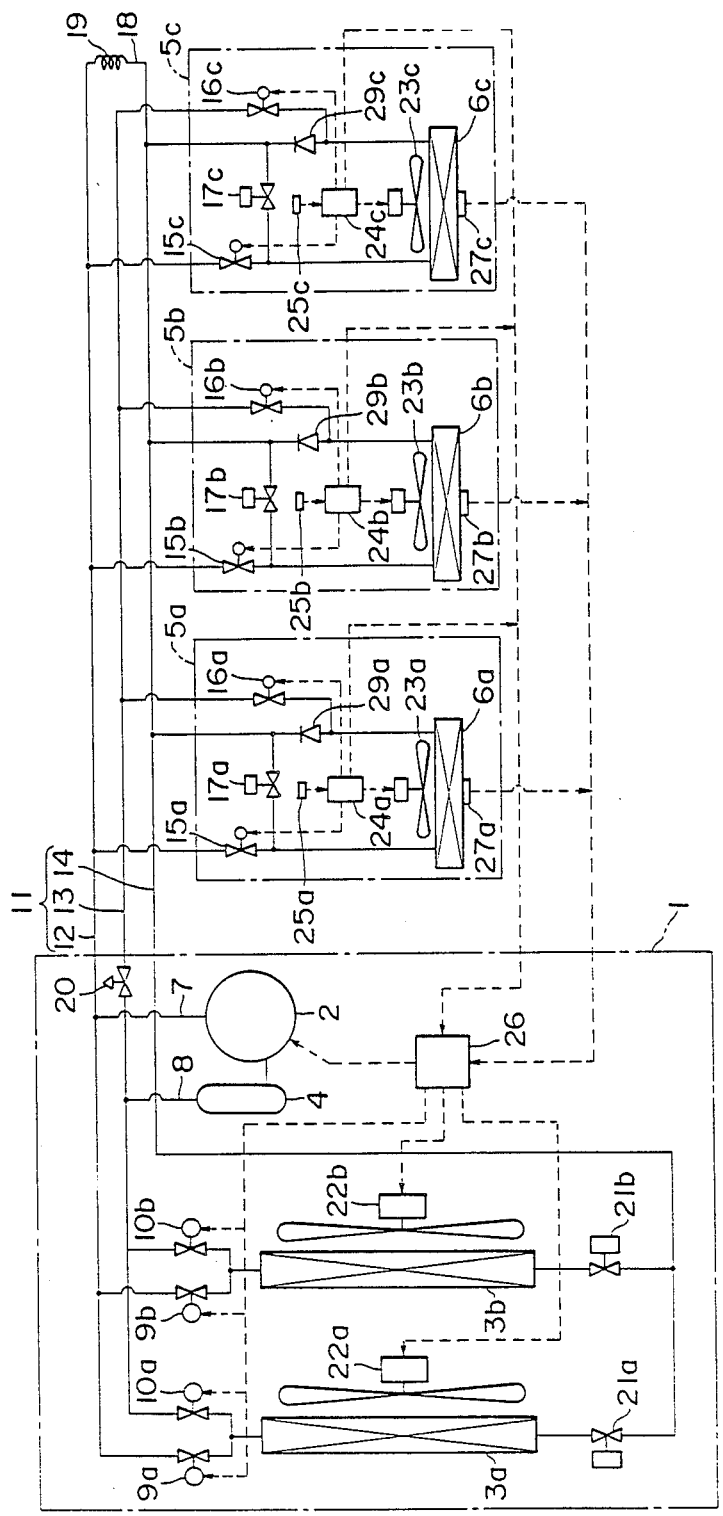
FIG. 7 is a diagram of a refrigerant circuit in a fifth embodiment of the present invention.

FIG. 7 shows a fifth embodiment of the present invention, in which the pipes in the room units 5a, 5b, 5c are connected as shown in the drawing, this embodiment being provided with inside valves 15a, 16a, 15b, 16b, 15c, 16c, coolant pressure reducing devices 17a, 17b, 17c and check valves 29a, 29b, 29c. During a room cooling operation, a liquid refrigerant from a liquid pipe 14 is subjected to the reduction of pressure thereof in the expansion devices 17a, 17b, 17c, and then flows through indoor heat exchangers 6a, 6b, 6c, inside valves 16a, 16b, 16c and low-pressure gas pipe 13. During a room heating operation, a gaseous refrigerant from a high-pressure gas pipe 12 flows through the inside valves 15a, 15b, 15c, indoor heat exchangers 6a, 6b, 6c, check valves 29a, 29b, 29c and liquid pipe 14. The remaining portions of these operations are identical with the corresponding portions in the first embodiment. The parts of the fifth embodiment which correspond to those of the first embodiment are designated by the same reference numerals, and the detailed descriptions thereof are omitted.

Figure 8:
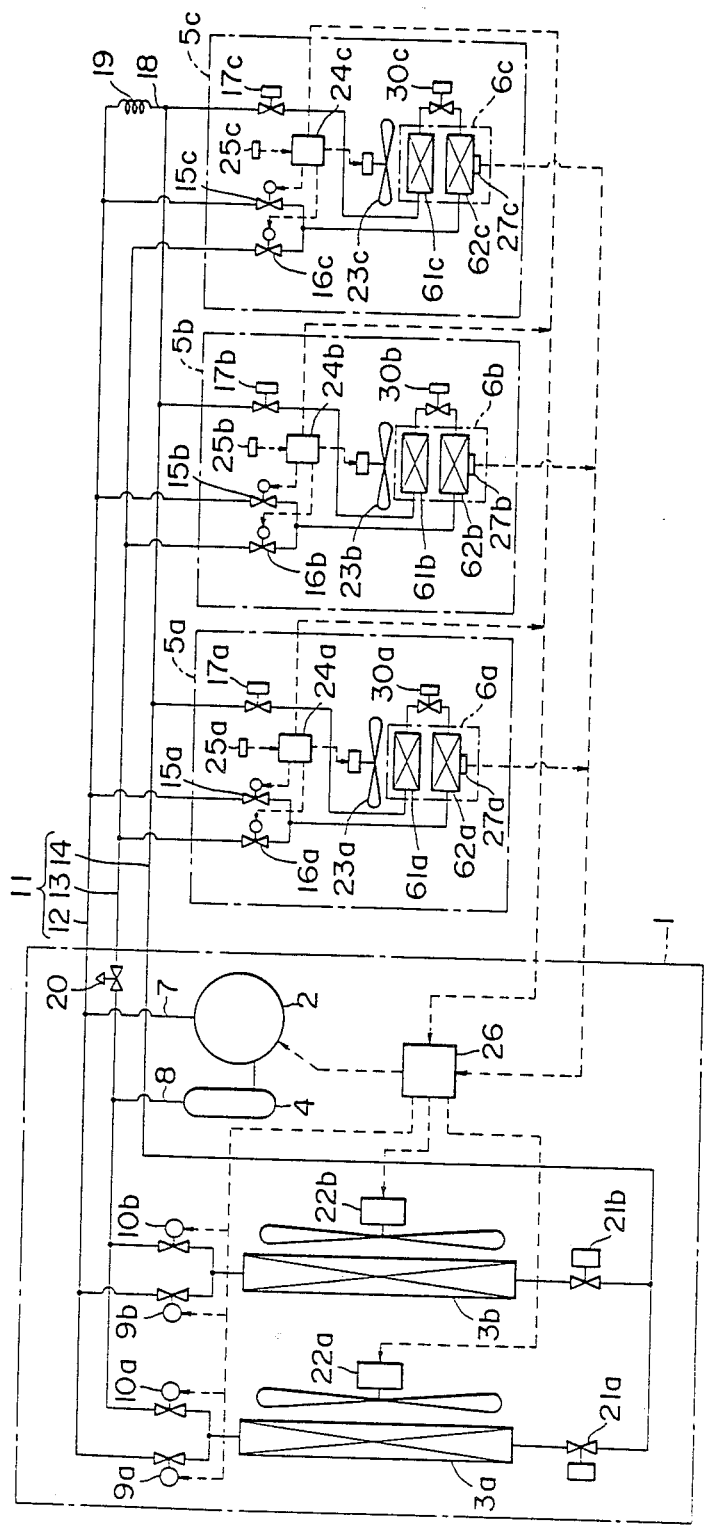
FIG. 8 is a diagram of a refrigerant circuit in a sixth embodiment of the air-conditioning apparatus according to the present invention.

FIG. 8 shows a sixth embodiment of the present invention. In this embodiment, indoor heat exchangers 6a, 6b, 6c are divided in two, i.e. first heat exchangers 61a, 61b, 61c and second heat exchanger members 62a, 62b, 62c, and dehumidifying expansion devices 30a, 30b, 30c having electric expansion valves are provided between these heat exchanger members. During a room cooling operation, the pressure of a liquid refrigerant from a liquid pipe 14 is reduced by the expansion devices 17a, 17b, 17c, and the refrigerant thereafter flows through the first heat exchanger members 61a, 61b, 61c, fully-opened dehumidifying expansion devices 30a, 30b, 30c, second heat exchanger members 62a, 62b, 62c, and inside valves 16a, 16b, 16c, the rooms being cooled by the first and second heat exchanger members 61a, 62a, 61b, 62b, 61c, 62c, which work as evaporators. In the meantime, during a room heating operation, a gaseous refrigerant from a high-pressure gas pipe 12 flows through the inside valves 15a, 15b, 15c, second heat exchanger members 62a, 62b, 62c, fully opened dehumidifying expansion devices 30a, 30b, 30c, first heat exchanger members 61a, 61b, 61c, expansion devices 17a, 17b, 17c and liquid pipe 13, and the rooms are heated by the first and second heat exchanger members 61a, 62a, 61b, 62b, 61c, 62c which work as condensers.

During dehumidification, a liquid refrigerant from the liquid pipe 14 flows through the fully opened expansion devices 17a, 17b, 17c and first heat exchanger members 61a, 61b, 61c, and the pressure thereof is reduced in the dehumidifying expansion devices 30a, 30b, 30c. The refrigerant thereafter flows through the second heat exchanger members 62a, 62b, 62c and inside valves 16a, 16b, 16c, and the air in the rooms, which is cooled in the second heat exchanger members 62a, 62b, 62c working as evaporators, is heated again in the first heat exchanger members 61a, 61b, 61c, which work as condensers, to be dehumidified. The control operation carried out by the room cooling and heating mode switching device 24a, 24b, 24c and a capacity switching device is identical with that in the above-described first embodiment. The parts of the sixth embodiment which correspond to those of the first embodiment are designated by the same reference numerals, and the detailed descriptions thereof are omitted.

Figure 9:
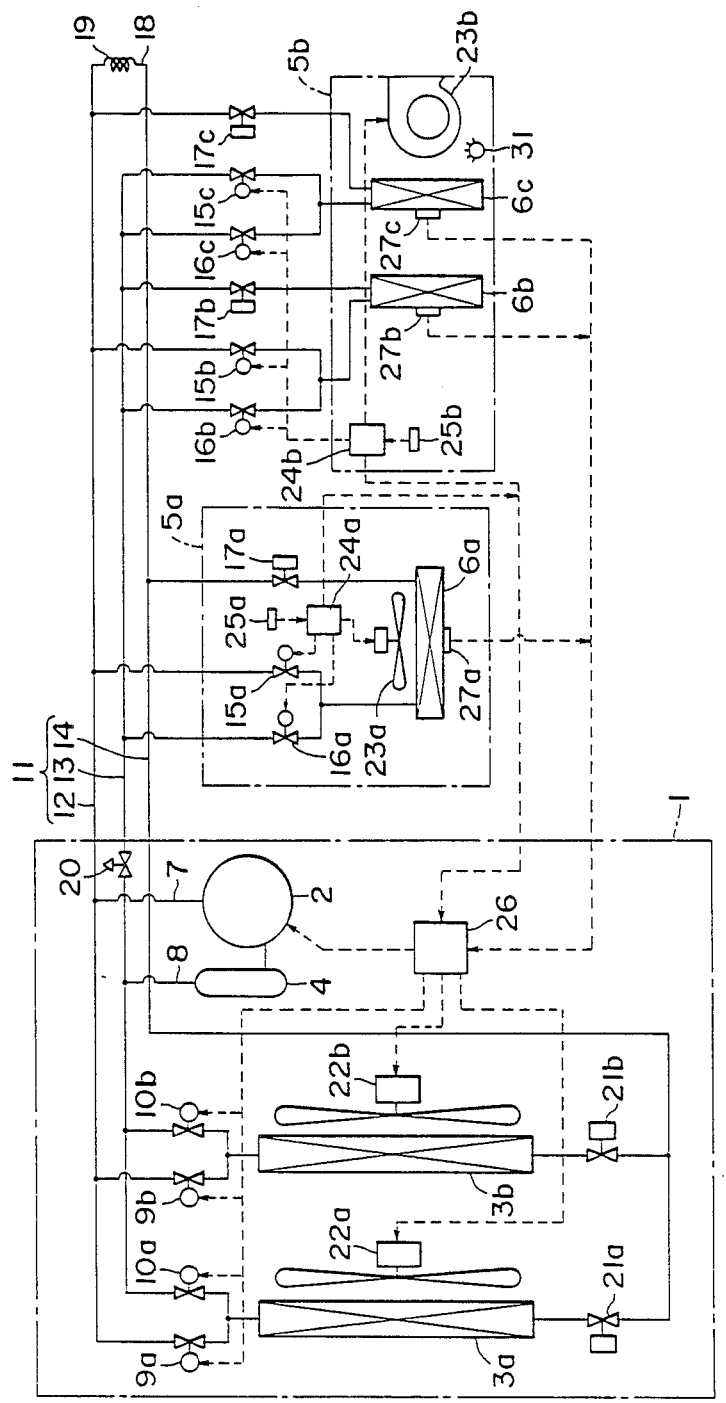
FIG. 9 is a diagram of a refrigerant circuit in a seventh embodiment of the air-conditioning apparatus according to the present invention.

FIG. 9 shows a seventh embodiment of the present invention. In one room unit 5a, room cooling and heating operations are carried out arbitrarily by operating the inside valves 15a, 16a. In the other room units 5b, a cooling operation is carried out when the indoor heat exchangers 6b, 6c work as evaporators through the operations of the inside valves 15b, 16b, 15c, 16c and a heating operation when the indoor heat exchangers 6b, 6c work as condensers through the operations of the same valves, a dehumidification operating being carried out when the indoor heat exchangers 6b, 6c work as an evaporator and a condenser, respectively, a humidity regulating humidifier 31 being also provided. A control operation carried out by the room cooling and heating mode switching device 24a, 24b and a capacity control device 26 is identical with that in the above-described first embodiment of FIG. 1, and the parts of the seventh embodiments which correspond to those of the above-described first embodiment are designated by the same reference numerals, and the detailed description thereof are omitted.

Figure 10:
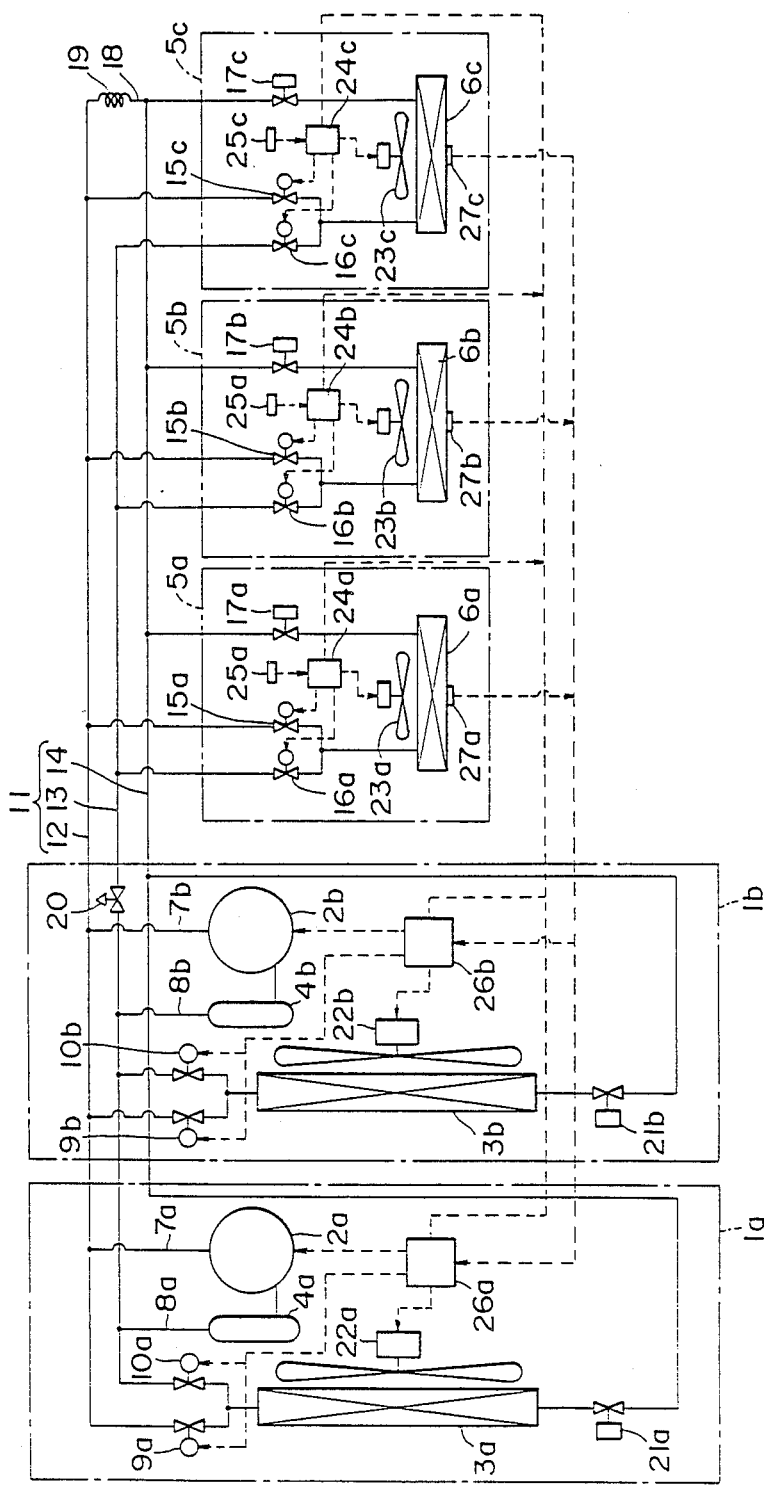
FIG. 10 is a diagram of a refrigerant circuit in an eighth enbodiment of the air-conditioning apparatus according to the present invention.

FIG. 10 shows an eighth embodiment of the present invention. This embodiment differs from the first embodiment in that two outdoor side units 1a, 1b are provided, one unit 1a of which contains therein a capacity variable compressor 2a, outdoor heat exchanger 3a, a gas-liquid separator 4a, outside valves 9a, 10 and an auxiliary expansion device 21a, and the other unit 1b of which contains therein a constant capacity compressor 2b, the capacity of which does not vary, an outdoor heat exchanger 3b, a gas-liquid separator 4b, outside valves 9b, 10b and an auxiliary expansion device 21b, the refrigerant discharge pipes 7a, 7b being connected to a high-pressure gas pipe 12, the refrigerant suction pipes 8a, 8b being connected to a low-pressure gas pipe 13. The switching of the capacity-variable compressor 2a, the starting and stopping of the constant-capacity compressor 2b, and the opening and closing of the change-over valves 9a, 10a, 9b, 10b, 15a, 16a, 15c, 16c are carried out in the same manner as in the first embodiment by the control operations carried by the cooling and heating mode switching device 24a, 24b, 24c and capacity switching device 26a, 26b, whereby an all-room cooling operation, an all-room heating operation and simultaneous room cooling and heating operations can be carried out.

In each of the above embodiments, two or three indoor units 5a, 5b, 5c are used. Even when not less than four room units of different capacity are used, they may simply be connected in a branching manner to inter-unit pipes 11. If outdoor heat exchangers or outdoor side units are connected in a branching manner in accordance with the number of the room units, the number of the outdoor heat exchangers or outdoor side units can be increased easily. The capacity-variable compressor 2, 2a may also be provided in outdoor side units other than the outdoor side units having the heat exchangers 3a, 3b. Besides, the frequency converting compressors may be used as the capacity variable compressor 2, 2a.

In the above embodiments, two-way valves are used for the change-over valves 9a, 10a, 9b, 10b, 15a, 16a, 15b, 16b 15c, 16c. A total of five three-way valves may also be provided by substituting three-way valves for the change-over valves 9a, 10a, 9b, 10b.

A plurality of outdoor heat exchangers, 3a, 3b, in the above embodiments are formed separately, but may also be formed integrally.

According to the present invention, the inter-unit pipes, by which the outdoor unit and a plurality of room units are connected together, has a high-pressure gas pipe, a low-pressure gas pipe and a liquid pipe, so that any number of room units can be combined by simply connecting room units in a branching manner to the inter-unit pipes. Also, not only the simultaneous room cooling operations and simultaneous room heating operations of a plurality of arbitrarily selected room units but also the simultaneous room cooling and heating operations thereof can be carried out. In addition, in the simultaneous room cooling operations, simultaneous room heating operation and simultaneous room cooling and heating operations, a capacity of the compressors required by the room unit for cooling operations is compared wit a capacity of the compressors required by the room unit for heating operations, and the capacity variable compressors are driven in accordance with the larger capacity of the two, so that efficient cooling and heating operations can be realized with an optimum capacity of the compressors. The room cooling and heating operations of the room units can be carried out arbitrarily, by varying the capacity of the capacity variable compressors and switching the capacity of the outdoor heat exchangers in accordance with the temperature or refrigerant pressure in the heat exchangers in the room units, which are subjected to a room cooling operation and a room heating operation, or the temperature of the air being discharged, so as to prevent the freezing of the indoor heat exchangers and an abnormal increase of the high pressure.

Moreover, since the indoor heat exchangers operated as condensers during simultaneous room cooling and heating operations and the indoor heat exchangers operated as evaporators during the same operations are connected in series, the room cooling and heating operations can be carried out efficiently on the basis of the efficient heat recovering actions of the heat exchangers.

The present invention is not, of course, limited to the above embodiments; it may be modified in various ways within the scope of the appended claims.

What is claimed is:

1. An air conditioning apparatus comprising: an outdoor side unit having a compressor, and an outdoor heat exchanger placed in contact with outside air or water, a plurality of room units having a indoor heat exchanger placed in contact with indoor air for selectively providing heating or cooling, wherein a high-pressure gas pipe, connected at one end thereof to said compressor, has high-side branch pipes, low-pressure gas pipe being connected at one end thereof to said compressor and having low-side branch pipes, at least one said high-side branch pipes and at least one of said low-side branch pipes being connected to one end of said outdoor heat exchanger via an outside valve for changing refrigerant flow, another portion of said high-side branch pipes having auxiliary high-side pipes, another portion of said low-side branch pipes having auxiliary low-side pipes, said auxiliary high-side pipes and said auxiliary low-side pipes being connected to one end of said indoor heat exchangers via an inside valve for changing refrigerant flow, a liquid pipe being connected to the other end of said outdoor heat exchanger and having liquid branch pipes, said liquid branch pipes connected to the other ends of said indoor heat exchangers via expansion devices, and wherein said other portion of said high-side branch pipe, at least a part of each of said auxiliary high-side pipes, said other portion of said low-side branch pipe, at least a part of each of said auxiliary low-side pipes, a part of said liquid pipe and at least a part of each of said liquid branch pipes are disposed between said outdoor side unit and said room units.

2. An air-conditioning apparatus according to claim 1, wherein a plurality of said outdoor heat exchangers are provided so that one end of each of said outdoor heat exchangers is connected to said high-side branch pipes and said low-side branch pipes via said outside valves, and the other ends of said outdoor heat exchangers are connected to said liquid pipe.

3. An air-conditioning apparatus comprising: an outdoor side unit having a capacity-variable compressor, and an outdoor heat exchanger placed in contact with outside air or water, a plurality of room units having indoor heat exchangers placed in contact with indoor air for selectively providing heating or cooling, and an operation controller adapted to control said capacity-variable compressor and valves for changing refrigerant flow, wherein a high-pressure gas pipe being connected at one end thereof to said compressor has high-side branch pipes, a low-pressure gas pipe being connected at one end thereof to said compressor has low-side branch pipes, at least one of said high-side branch pipes and at least one of said low-side branch pipes being connected to one end of said outdoor heat exchanger via an outside valve, another portion of said high-side branch pipes having auxiliary high-side pipes, an other portion of said low-side branch pipes having auxiliary low-side pipes, said auxiliary high-side pipes and said auxiliary low-side pipes being connected to one end of said indoor heat exchangers via an inside valve, a liquid pipe being connected to the other end of said outdoor heat exchanger and having liquid branch pipes, said liquid branch pipes being connected to the other ends of said indoor heat exchangers via expansion devices, wherein said operation controller has capacity setting means for comparing first compressor capacity required by said room unit in a room cooling operation with a second compressor capacity required by said room units in a room heating operation during simultaneous room cooling and heating operations, wherein at least one of said room units is subjected to a room cooling operation with the remaining ones of said room units subjected to a room heating operation, and operating said capacity-variable compressor with the capacity set to a level corresponding to the higher capacity of said first compressor capacity and said second compressor capacity.

4. An air-conditioning apparatus comprising: an outdoor side unit having a capacity-variable compressor, and an outdoor heat exchanger placed in contact with outside air or water, a plurality of room units having indoor heat exchangers placed in contact with indoor air for selectively providing heating or cooling, and an operation controller adapted to control said capacity-variable compressor and valves for changing refrigerant flow, wherein a plurality of said outdoor heat exchangers are provided, a high-pressure gas pipe being connected at one end thereof to said compressor and having high-side branch pipes, a low-pressure gas pipe being connected at one end thereof to said compressor and having low-side branch pipes, at least two of said high-side, branch pipes and at least two of said low-side branch pipes being connected to one end of said outdoor heat exchanger via said valve, another portion of said high-side branch pipes having auxiliary high-side pipes, another portion of said low-side branch pipes having auxiliary low-side pipes, said auxiliary high-side pipes and said auxiliary low-side pipes being connected to one end of said indoor heat exchangers via said valves, a liquid pipe being connected to the other ends of said outdoor heat exchangers and having liquid branch pipes, said liquid branch pipes being connected to the other ends of said indoor heat exchangers via expansion devices, wherein said operation controller has capacity varying means adapted to control the capacity of said capacity-variable compressor and said valves in accordance with at least one of the temperature, refrigerant pressure in said indoor heat exchangers, and temperature of the indoor air discharged from said room units.

* * * * *